United States Patent
Hamano et al.

(10) Patent No.: US 9,460,603 B2
(45) Date of Patent: Oct. 4, 2016

(54) NAVIGATION SYSTEM

(71) Applicant: HONDA MOTOR CO., LTD., Tokyo (JP)

(72) Inventors: Yusuke Hamano, Utsunomiya (JP); Koji Sengoku, Saitama (JP); Takuro Masuda, Fujimino (JP); Tadafumi Nogawa, Rancho Palos Verdes, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/774,398

(22) PCT Filed: Feb. 28, 2014

(86) PCT No.: PCT/JP2014/055028
§ 371 (c)(1),
(2) Date: Sep. 10, 2015

(87) PCT Pub. No.: WO2014/148225
PCT Pub. Date: Sep. 25, 2014

(65) Prior Publication Data
US 2016/0027281 A1    Jan. 28, 2016

(30) Foreign Application Priority Data

Mar. 18, 2013   (JP) .................... 2013-055397

(51) Int. Cl.
*G08B 21/10* (2006.01)
*G01C 21/20* (2006.01)
(Continued)

(52) U.S. Cl.
CPC .............. *G08B 21/10* (2013.01); *G01C 21/20* (2013.01); *G08G 1/096716* (2013.01); *G08G 1/096741* (2013.01); *G08G 1/096775* (2013.01); *G09B 29/007* (2013.01); *G09B 29/10* (2013.01)

(58) Field of Classification Search
CPC .................. G08B 21/10; G01C 21/20; G08G 1/096775; G08G 1/096741; G09G 29/007; G09G 29/10
USPC ........................................................ 701/515
See application file for complete search history.

(56) References Cited

U.S. PATENT DOCUMENTS

2009/0281850 A1* 11/2009 Bruce ................ G01C 21/3438
705/80

FOREIGN PATENT DOCUMENTS

| JP | 2007-060489 A | 3/2007 |
|---|---|---|
| JP | 2008-158599 A | 7/2008 |

(Continued)

OTHER PUBLICATIONS

International Search Report and Written Opinion dated Jun. 3, 2014 corresponding to International Patent Application No. PCT/JP2014/055028 and English translation thereof.

*Primary Examiner* — Anne M Antonucci
(74) *Attorney, Agent, or Firm* — Squire Patton Boggs (US) LLP

(57) ABSTRACT

Provided is a navigation system capable of, when an emergency situation occurs, immediately distributing, to a mobile terminal that is a client terminal located in a region impacted by the emergency situation, required information according to the terminal position in order of priority. During an emergency situation such as when a disaster or the like occurs, information on the emergency situation is distributed from a server, as a priority, simultaneously to each mobile terminal located in an area that is strongly impacted (for example, areas marked with a circled 1) immediately, regardless of when terminal position information is received from the mobile terminals, and the information on the emergency situation is displayed on a display device of the mobile terminal and a display device of a DA device to which same was distributed.

3 Claims, 7 Drawing Sheets

(51) Int. Cl.
*G09B 29/10* (2006.01)
*G09B 29/00* (2006.01)
*G08G 1/0967* (2006.01)

(56) References Cited

FOREIGN PATENT DOCUMENTS

| JP | 2009-210345 A | 9/2009 |
| JP | 2010-045641 A | 2/2010 |
| JP | 2012-174233 A | 9/2012 |
| JP | 2013-088827 A | 5/2013 |
| JP | 2013-218477 A | 10/2013 |

* cited by examiner

FIG. 6

| TSUNAMI CLASSIFICATION | CLASSIFICATION PRIORITY Ps | | IMPACT PRIORITY Pi | SUM Σ | COMPREHENSIVE PRIORITY LEVEL Pt (PRIORITY RANKING) |
|---|---|---|---|---|---|
| LARGE TSUNAMI WARNING | HIGH | 1 | ① | 2 | 1 |
| | | | ② | 3 | 2 |
| | | | ③ | 4 | 4 |
| TSUNAMI WARNING | INTERMEDIATE | 2 | ① | 3 | 3 |
| | | | ② | 4 | 5 |
| | | | ③ | 5 | 7 |
| TSUNAMI ADVISORY | LOW | 3 | ① | 4 | 6 |
| | | | ② | 5 | 8 |
| | | | ③ | 6 | 9 |

110: DELIVERY PRIORITY TABLE

NAVIGATION SYSTEM

TECHNICAL FIELD

The present invention relates to a navigation system, the invention being applied suitably to a navigation system which, when terminal position information that is transmitted at predetermined time intervals individually from client terminals incorporated in a plurality of respective vehicles is received by a server, is configured so as to transmit (in reply) information concerning the surrounding areas of the terminal positions from the server to the respective client terminals.

As examples of client terminals, there can be given a mobile terminal, such as a smart phone or the like, which is capable of being used for navigation to provide route guidance or the like, a navigation device installed in a vehicle, or display audio device that is installed in a vehicle.

BACKGROUND ART

In the case that the occurrence of disasters caused by natural phenomena or the like are to be expected, emergency information such as warnings and advisories (disaster prevention information, disaster information for disaster mitigation) may be transmitted from a meteorological association or the like. Further, in the case of the occurrence of traffic congestion, accidents, traffic restrictions or the like, emergency information responsive thereto may be transmitted from a road traffic information center or the like.

A server of the information center, upon receipt of such emergency information that is transmitted from an emergency information dispatch center such as the meteorological association and the road traffic information center, delivers the emergency information to a plurality of client terminals that reside in a region managed by the server.

As an emergency warning system in which emergency information is delivered simultaneously, Japanese Laid-Open Patent Publication No. 2008-158599 (hereinafter referred to as JP2008-158599A) discloses creating and updating, among mobile terminals whose positions have previously been registered in a base station, a list of mobile terminals that exist within the base station as a notification list, and when the base station obtains emergency information of an earthquake, a tsunami, a fire or the like, delivers the emergency information simultaneously to the mobile terminals that are listed in the notification list. As a result, emergency information can be notified reliably to a plurality of mobile terminals, the positions of which have been registered beforehand within a range of the base station (see FIG. 1 and paragraphs [0021] to [0022] of JP2008-158599A).

Further, as a system for delivering emergency information, Japanese Laid-Open Patent Publication No. 2007-060489 (hereinafter referred to as JP2007-060489A) discloses an in-vehicle receiver that sorts through contents of a data broadcast of the same format in relation to emergency information that is transmitted from a broadcast station, using position information of a disaster occurrence point included in the data broadcast, and self-position information of a vehicle itself that is detected by a global positioning system (GPS) in the vehicle, and displaying a portion of the data broadcast as an image on a monitor of a navigation device (see abstract, FIGS. 1, 8, and 13, and paragraph [0056] of JP2007-060489A).

SUMMARY OF THE INVENTION

However, with the technology disclosed in JP2008-158599A, since notifications to the respective mobile terminals are delivered simultaneously to the respective mobile terminals inside of the base station (i.e., that reside within a zone to which the base station corresponds), users located at various places within the base station all receive the same information, and since the respective users themselves are forced to receive information whose direct relation to the user is slight, it is necessary for the user to discern (sift through) necessary information and unnecessary information corresponding to the position of the user. Further, there is a problem in that, in order to create the list at each of predetermined times, the latest mobile terminal positions cannot be grasped at the time of delivery.

Further, with the technology disclosed in JP2007-060489A, although display of images is carried out concerning emergency information including the self-position (of the vehicle itself), since data of the same format, which is delivered by broadcast waves, is sorted through in part and displayed on the side of the vehicle, the data is inevitably uniform over a wide area, and further, updating frequency of partial data updating on the side of the broadcast station is limited because the updating frequency is involved with the data as a whole. Therefore, in particular, with the disaster information, for example, tsunami information or the like, for which the degree of influence thereof is locally large, a problem occurs in that it is difficult to sufficiently grasp the degree of influence at the self-position of the vehicle.

As a technique for solving the aforementioned problems, there can be considered to use a navigation system in which, responsive to receipt on the side of a server of terminal position information, which is transmitted at predetermined time intervals from the respective client terminals, peripheral information of positions around where the client terminals are located is transmitted (in reply) to the client terminals from the server, thereby enabling appropriate individual information to be delivered of results under which information of an emergency situation and updated position information of the respective client terminals are judged on the side of the server comprehensively.

However, with such a navigation system, there is a problem in that, the timing for information delivery inevitably forces the information to be transmitted after first waiting for a timing at which the terminal position information from the client terminals is received at predetermined time intervals, for example, at intervals of 5 to 10 minutes. Therefore, transmission of the information is delayed by such a wait time.

Furthermore, in the case that the number of client terminals is large, for example, from several ten thousand to several hundred thousand units, due to the fact that the transmissions to the respective client terminals from the server are concentrated and the transmission line becomes overcrowded, the communication speed is extremely lowered, an in a worst case, there is a fear that disruptions may be brought about such as disconnection of the transmission line.

The present invention has been devised taking into consideration the aforementioned problems, and has the object of providing a navigation system which, upon the occurrence of an emergency situation, is capable of prioritizing and speedily delivering to client terminals, which are positioned in regions affected by the emergency situation, necessary information responsive to the client terminal positions depending on the degree of importance thereof.

A navigation system according to the present invention is configured to transmit from a server information concerning surrounding areas of respective client terminals, when terminal position information, which is transmitted at a predetermined interval individually from the respective client terminals, is received by the server. The server includes a terminal position storage device that sequentially updates and stores the respective terminal position information when the respective terminal position information is received from the respective client terminals. When the occurrence of an emergency situation is recognized, the server divides a region that is affected by the emergency situation into a plurality of areas to which priority levels are given for each degree of influence of the emergency situation thereon, retrieves from the terminal position storage device positions of the client terminals that reside within the divided areas, prioritizes the client terminal positioned within an area for which the degree of influence is large, and delivers immediately and simultaneously thereto information relating to the emergency situation, regardless of time at which the terminal position information therefrom was received, and forcibly displays the information relating to the emergency situation on a monitor of the client terminal to which the information was delivered.

According to the present invention, upon the occurrence of an emergency situation such as when a disaster occurs or the like, information of the emergency situation, which is delivered preferentially from the server to each of the client terminals positioned in regions where the degree of influence is large, can be delivered immediately and simultaneously thereto regardless of the time at which the terminal position information is received, and information of the emergency situation can be displayed on monitors of the client terminals to which such information was delivered.

In this way, preferential delivery of information is enabled without placing an excessive load on the server. As a result, users of the respective client terminals, at the current self-position thereof, can quickly receive information for which the degree of influence that is separated out from the emergency information or the like is large, and can swiftly take actions responsive to a disaster or the like.

Further, since information, which has a small effect on the self-position at that time, is not received unnecessarily, it is possible to suppress any undue worries with respect to the emergency information.

In this case, when the occurrence of the emergency situation is recognized, the server may aggregate a number of the client terminals that reside internally within each of the divided areas as to latest updated positions of the client terminals. In addition, in a case that a number of deliveries from the server to the respective client terminals exceeds a predetermined number for which simultaneous delivery is possible, the server may divide the number of deliveries into a plurality of times within a range of the predetermined number, prioritize the client terminals positioned within the area for which the degree of influence is large, and deliver simultaneously thereto the information relating to the emergency situation.

According to the present invention, since the server grasps the number of the client terminals that are to serve as delivery targets, and performs preferential delivery to client terminals for which the degree of influence of a disaster is large, in the case information is delivered all at once, even under a condition in which the number of communication lines for simultaneous delivery is limited, it is possible for such information to be delivered quickly and without difficulty.

Furthermore, the server may set each of the client terminals, for which the respective terminal position information therefor that is stored in the terminal position storage device has not been updated even though a preset time has elapsed, as an object to be excluded from those retrieved from the server.

More specifically, by judging that the client terminals have already moved from positions that have not been updated and excluding them from the information delivery targets, client terminals for which the terminal position information has not been updated within a preset time period can be prevented from erroneously displaying information outside of the target areas (impact-free areas, etc.), for a case in which the client terminals are mounted, for example, in automobiles (vehicles).

Further still, when the occurrence of the emergency situation is recognized, and upon dividing the region that is affected by the emergency situation into a plurality of areas to which priority levels are given for each degree of influence of the emergency situation thereon, retrieving from the terminal position storage device the terminal position information of the respective client terminals that reside within each of the areas, prioritizing the client terminal that resides within the area for which the degree of influence is large, and delivering simultaneously thereto the information relating to the emergency situation, and in addition, when a warning or advisory is set for the region that is affected by the emergency situation, the server may determine a priority ranking for the simultaneous delivery, based on a priority level of the warning or the advisory, and a priority level of the area.

For example, even concerning a disaster for which the geographical impact thereof is large, such as a tsunami warning, delivery of information can be carried out, to which a priority ranking is given taking into consideration the area where delivery is attempted, and the degree of influence of the tsunami on the terrain.

According to the present invention, upon the occurrence of an emergency situation, necessary information can be prioritized and speedily delivered to the client terminals, which are positioned in regions affected by the emergency situation, responsive to the client terminal positions and depending on the degree of importance thereof.

BRIEF DESCRIPTION OF DRAWINGS

FIG. 6 is an explanatory drawing showing an example of a delivery priority table.

DESCRIPTION OF EMBODIMENTS

A preferred embodiment of a navigation system according to the present invention will be described below with reference to the accompanying drawings, in relation to an emergency information delivery system in which the navigation system is used.

Figure 1:
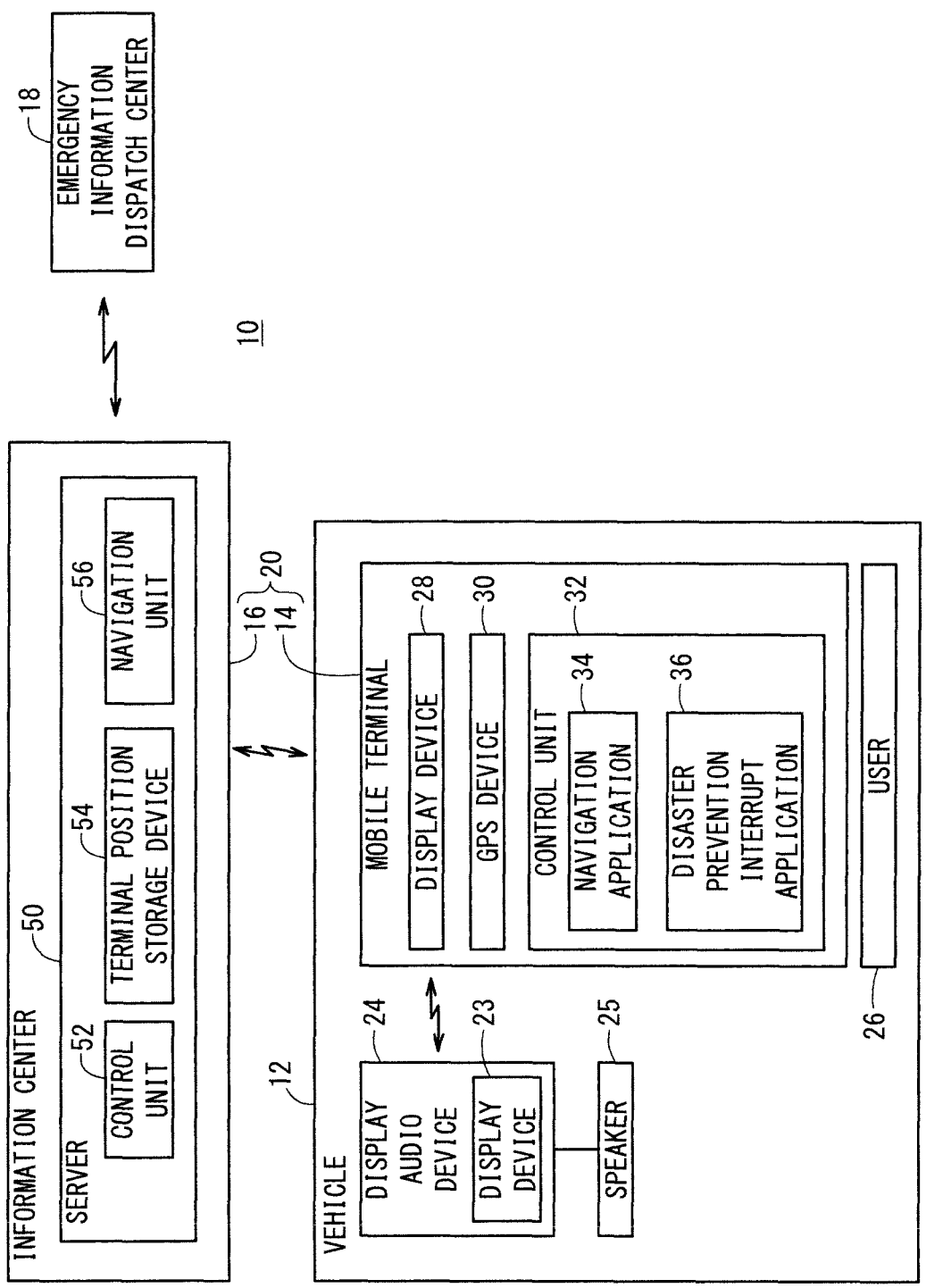
FIG. 1 is a block diagram of an emergency information delivery system in which a navigation system is used according to an embodiment of the present invention.

FIG. 1 is a block diagram of an emergency information delivery system 10 in which a navigation system is used according to an embodiment of the present invention.

The emergency information delivery system 10 is constituted basically from a vehicle 12, a mobile terminal 14, a navigation information center (also referred to more simply as an information center) 16, and an emergency information dispatch center 18.

In the vehicle 12, there are included a display audio device (referred to as a DA device) 24, which is an in-vehicle device that is fixedly arranged (mounted) in the vehicle 12, a user 26 such as a driver or a passenger seat occupant, and a mobile terminal 14 that is brought into the vehicle 12 by the user 26.

The navigation system 20 is constituted from the mobile terminal 14 and the information center 16 equipped with a server 50.

The mobile terminal 14 is made up from a portable telephone, a smart phone, or a tablet terminal or the like, which is equipped with a touch panel type display device 28, a GPS device 30, and a control unit 32. The control unit 32 of the mobile terminal 14 is a computer, which operates as various functional units (also referred to as functional means), by a CPU (central processing unit) thereof executing programs that are stored in a storage device.

As programs that are stored in the mobile terminal 14, in addition to a basic application for implementing a telephone function (including a calling function and a data communications function over telephone), a short-range low-power wireless communications function of Bluetooth (registered trademark) or Wi-Fi, etc., and a hands free call function in which the short-range low-power wireless communications function is used, there is stored a disaster prevention interrupt application 36 including a display function or the like for displaying an interrupt screen of disaster prevention information, a navigation application 34 used for carrying out route guidance, or the like.

The navigation application 34 and the disaster prevention interrupt application 36 can be selected by the user 26, etc., through a mobile communications network or a public communications network, and downloaded with a fee or at no cost to the mobile terminal 14 from ABC store or XYZ market on a non-illustrated web server (external application supply server) that serves as an application download source.

In this case, if the disaster prevention interrupt application 36 is downloaded from a web server and installed (stored) on the mobile terminal 14, the application is set so as to run as a resident program in the background.

Moreover, in the same manner as the basic application, the navigation application 34 and the disaster prevention interrupt application 36 may be stored beforehand in the mobile terminal 14 at the time of product shipment.

A non-illustrated microphone that is fixed in the vehicle compartment and a speaker 25 etc. that is fixed in the vehicle compartment are connected to the DA device 24. The DA device 24 is arranged in an instrument panel, and similar to the mobile terminal 14, is operated and can be used by a user 26 such as the driver or a passenger seat occupant. A GPS device may also be incorporated into the DA device 24.

According to the present embodiment, the DA device 24, which is equipped with a display device 23 having a screen area (screen size) larger than the screen area of the display device 28 of the mobile terminal 14, and the mobile terminal 14 are connected so as to be capable of communicating wirelessly or over wires with each other. Of course, only the mobile terminal 14 can be applied as a client terminal.

When the mobile terminal 14 causes the navigation function to be operated, a screen, which is the same as the screen (a route guidance screen on a map) that is displayed on the display device 28 of the mobile terminal 14, can be displayed on the display device 23 of the DA device 24.

As will be discussed later, when the mobile terminal 14 causes the navigation function to be operated, and when emergency information is received, a configuration is enabled so as to display, in preference to the route guidance screen on the map, a screen of emergency information on the display device 28 of the mobile terminal 14 and on the display device 23 of the DA device 24.

Further, in the case that a navigation device equipped with a display device is installed as a vehicle-mounted device in the vehicle 12, a screen of the emergency information can be displayed on the navigation device.

The navigation device (not shown) or the DA device 24 is equipped with the GPS device 30 and a control unit, which is the same as the control unit 32 in which the navigation application 34 and the disaster prevention interrupt application 36 are installed, whereby the navigation device or the DA device 24 can also function as a client terminal according to the present invention in the same manner as the mobile terminal 14.

Using the GPS device 30, the mobile terminal 14 acquires from moment to moment the position (self-position) of the mobile terminal 14, in this case the position of the vehicle 12, and displays a vehicle mark (self-mark) on the map screen of the display device 28. Together therewith, at a first predetermined time interval T1, for example every five minutes, position information Ip (position information of the mobile terminal 14, also referred to as terminal position information), to which there is appended a terminal identification ID for identifying the terminal, is transmitted (notified) to the information center 16.

The server 50 is arranged in the information center 16. The server 50 comprises a control unit 52, which is a computer, a terminal position storage device 54, and a navigation unit 56 equipped with map information including facility information, a route search function, a route guidance function, and the like, to assist the navigation application 34 of the mobile terminal 14.

The server 50 of the information center 16 can support the navigation function on the mobile terminal 14, by delivering to the corresponding mobile terminals 14 map information, including facility information from the navigation unit 56, every time that position information Ip, to which there is appended a terminal identification ID from the respective mobile terminals 14, is received. Further, the map information, etc., delivered to the mobile terminal 14 is displayed simultaneously on the display device 23 of the DA device 24.

The information center 16 carries out data communications with the mobile terminal 14 using the mobile communications network or the public communications network, in addition to carrying out data communications with the emergency information dispatch center 18 using the public communications network, etc.

The emergency information dispatch center 18, for example, is a meteorological association or a road traffic information center, which delivers to the information center weather information such as rainfall information (rainfall map) and snowfall information (snowfall map), or traffic congestion information (traffic concentration information), etc., and at the time of an emergency, transmits emergency information such as disaster information to the information center 16.

When the navigation application 34 is initiated in the mobile terminal 14 and the connection of a communication line therewith is confirmed, the information center 16 establishes an association or linkage with the navigation unit 56. When a destination point is set with the mobile terminal 14, the navigation unit 56 calculates route guidance information from the present location to the destination point (as is well known, a departure point and a stopover point, a departure time, etc., can also be set), and navigation information, including the calculated route guidance information, corresponding map information, and semi-transparently displayed weather information, etc., is transmitted to the mobile terminal 14.

The mobile terminal 14 can display the received navigation information as a screen on the display device 28, and by forwarding the information to the DA device 24, the DA device 24 can also display the same navigation information on the screen of the display device 23.

The emergency information delivery system 10 that uses the navigation system 20 according to the present embodiment is constructed basically as described above. Next, operations of the emergency information delivery process in accordance with principal features thereof, will be described with reference to the flowchart of FIG. 2, which is implemented by the control unit 32 of the mobile terminal 14, and the flowchart of FIG. 3, which is implemented by the control unit 52 of the server 50.

Although in the flowcharts of FIGS. 2 and 3, the descriptions given therein are premised on a condition in which the navigation application 34 has already been activated, even in a non-activated state, since the disaster prevention interrupt application 36 resides in the background, as will be discussed later, when emergency information is received, a popup screen is displayed on the display device 28 of the mobile terminal 14, and on that screen, the navigation application 34 can be launched by the user 26 of the mobile terminal 14.

Figure 2:
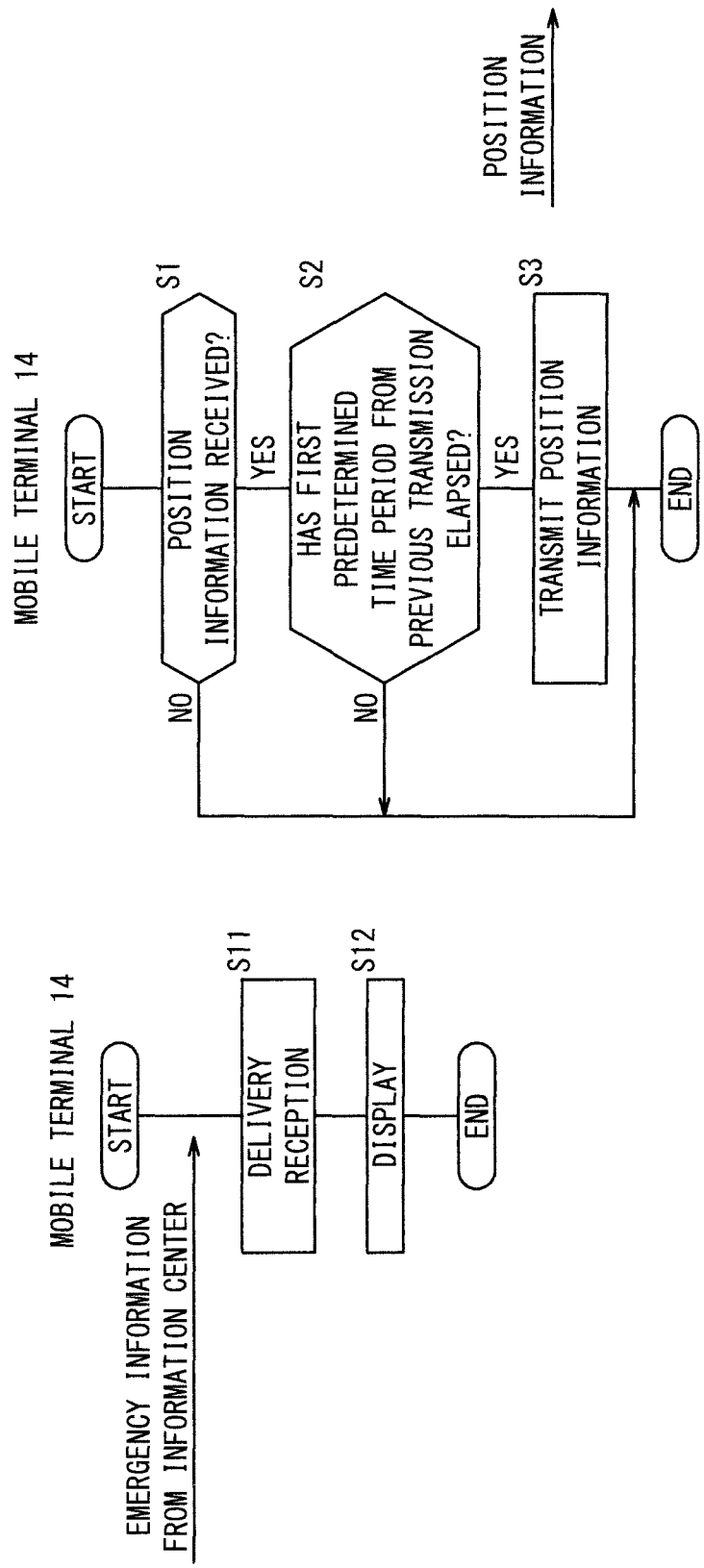
FIG. 2 is a flowchart of a process implemented by a control unit of a mobile terminal.
Figure 3:
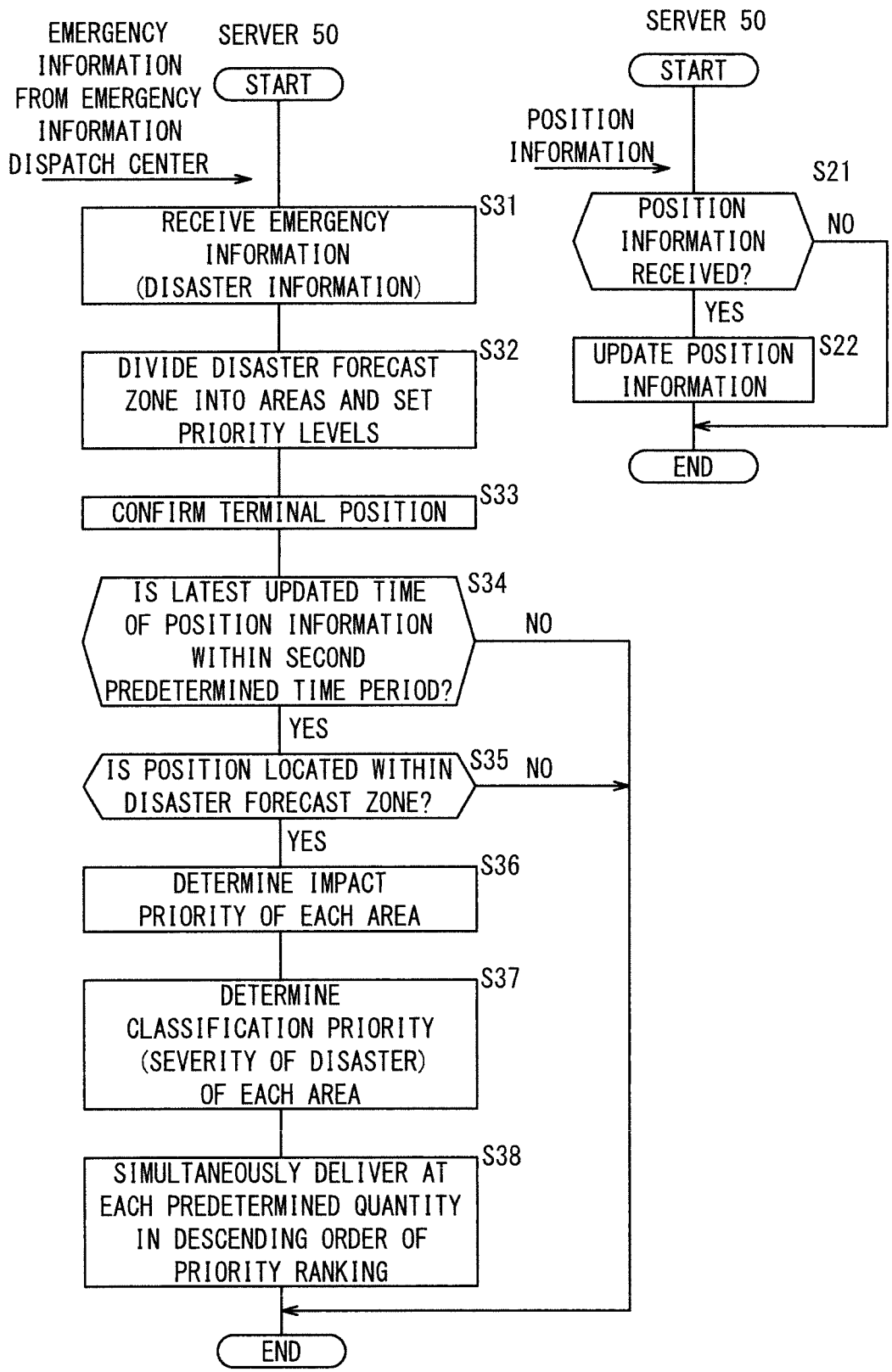
FIG. 3 is a flowchart of a process implemented by a control unit of a server.

For ease of understanding and to avoid complexity, in the emergency information delivery system 10, prior to implementing the processes of the flowcharts of FIGS. 2 and 3, the mobile terminal 14 that was brought into the vehicle 12 and the DA device 24 are in a connected state (a state enabling mutual communications therebetween) by way of an in-vehicle wireless communications protocol such as Bluetooth (registered trademark) or the like. Further, using the navigation application 34 of the mobile terminal 14, a communications linkage is established between the mobile terminal 14 and the information center 16 using a mobile communications network or a public communications network, thereby enabling the navigation function to be used.

The processes of steps S1 to S3 in the flowchart of the mobile terminal 14 shown in FIG. 2 are processes in relation to a position information uploading sequence, which is a normal sequence that is implemented when the mobile terminal 14 is initiated. The processes of steps S11 to S12 in the flowchart of the mobile terminal 14 shown in FIG. 2 are processes (event-driven processes) in relation to a disaster information delivery and receiving sequence, which is implemented by way of an interrupt process by the disaster prevention interrupt application 36, at a time that emergency information is received from the server 50 of the information center 16 (upon the occurrence of a so-called event).

The processes of steps S21 to S22 in the flowchart of the server 50 shown in FIG. 3 are processes in relation to the normal position information uploading sequence. The processes (event-driven processes) of steps S31 to S38 in the flowchart of the server 50 shown in FIG. 3 are processes in relation to a disaster information delivery sequence, which is implemented by way of an interrupt process, at a time that the server 50 has received the emergency information from the emergency information dispatch center (upon the occurrence of a so-called event).

In step S1 of the flowchart of FIG. 2, the control unit 32 of the mobile terminal 14 that is currently under activation judges whether or not self-position information Ip, which is calculated by the GPS device 30 upon receipt of GPS waves from a plurality of GPS satellites, has been received from the GPS device 30.

The position information Ip is reflected as a vehicle mark or the like, which is displayed on the map by the navigation application 34.

When the position information Ip has been received (step S1: YES), the received position information Ip is transmitted to the server 50 of the information center 16, and then in step S2, it is judged whether or not a first predetermined time period T1 from the previous time of transmission, for example five minutes, has elapsed.

If the first predetermined time period T1 from the previous time of transmission has elapsed (step S2: YES), then in step S3, the control unit 32 of the mobile terminal transmits to the information center 16 the position information Ip, to which there is appended the terminal identification information (terminal identification ID) of the mobile terminal 14.

If the position information Ip is not received in step S1 (step S1: NO), if the first predetermined time period T1 has not elapsed in step S2 (step S2: NO), and if the position information Ip has been transmitted in step S3, the process returns to step S1.

During normal operation in which the mobile terminal 14 repeatedly carries out the processes of steps S1 to S3, corresponding thereto, as shown in the flowchart of FIG. 3, in step S21, the server 50 judges whether or not position information Ip to which a terminal identification ID is appended has been received from the respective mobile terminals 14.

If the position information Ip to which the terminal identification ID is appended has been received (step S21: YES), then in step S22, the position information Ip is updated in the terminal position storage device 54. In this case, only the most recent one case of the position information Ip for the individual respective mobile terminals 14 is registered and stored in the terminal position storage device 54 (terminal position storage table) with the terminal position ID as an index.

In step S22, at the time that the position information Ip is registered and stored, if the position information Ip has not been received in step S21 (step S21: NO), the process returns to step S21.

On the other hand, in step S31, when the server 50 of the information center 16 has received emergency information (disaster information) from the emergency information dispatch center 18, then in step S32, as will be described in detail below, a disaster forecast zone in which the received emergency information is included is divided into areas of smaller regions. Together therewith, a classification priority Ps and an impact (degree of influence) priority Pi for the disaster forecast zone, which are used in later-described steps S36 to S38, are determined (calculated).

Figure 4:
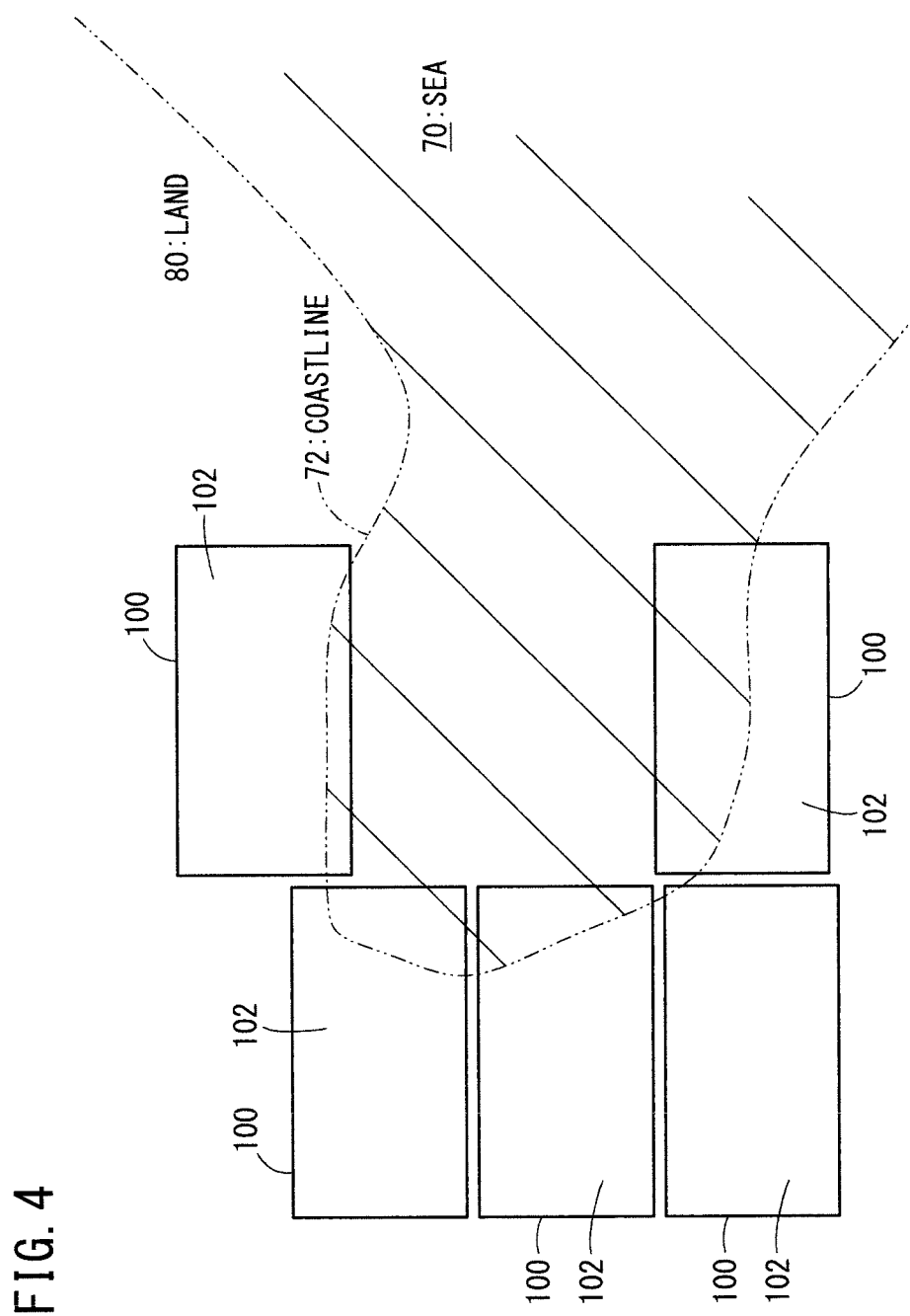
FIG. 4 is a schematic diagram showing sectioning of a disaster forecast zone, which is emergency information received by the server from an emergency information center.

FIG. 4 is a schematic diagram that illustrates sectioning of a disaster forecast zone 100, corresponding to tsunami information as an example, which is emergency information that is received in step S31 by the server 50 from the emergency information dispatch center 18.

In the schematic diagram, five disaster forecast zones 100 are allocated to land 80 lying adjacent to the sea 70 through a coastline 72. In practice, a classification 102 of severity of the disaster is assigned to each of the respective disaster forecast zones 100. In step S32, the control unit 52 sets a classification priority (classification delivery priority) Ps with respect to such classifications 102. For example, in the case that the classifications 102 are a large tsunami warning, a tsunami warning, and a tsunami advisory, respectively, the classification priorities Ps therefor are set to large (classification priority Ps: first level) for the large tsunami warning, intermediate (classification priority Ps: second level) for the tsunami warning, and low (classification priority Ps: third level) for the tsunami advisory.

Figure 5:
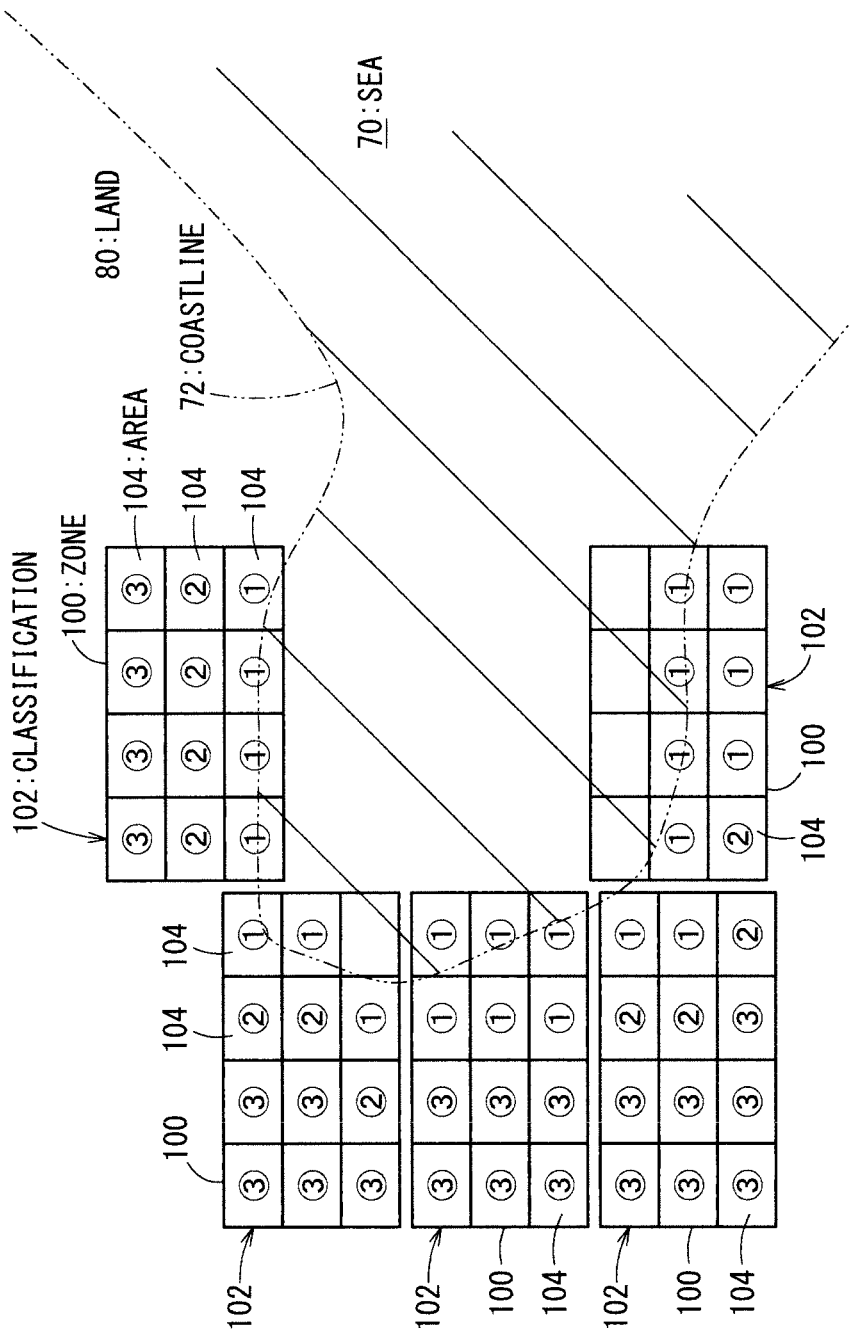
FIG. 5 is an explanatory drawing of area division of the disaster forecast zone.

Next, as shown in FIG. 5, the control unit 52 divides the respective disaster forecast zones 100 into areas 104 on the order of 10 km square (10 km×10 km). As shown in FIG. 5, in the process of step S32, each of the disaster forecast zones 100 is divided into twelve individual areas 104, respectively.

Furthermore, the control unit 52 sets the impact priority (impact delivery priority) Pi, in the order in which the degree of influence of the disaster is estimated to be large, based on the position on the terrain or the map in each of the respective divided areas 104. In the example shown in FIG. 5, as shown by the circled numbers, the impact priority Pi of areas 104 of land 80 that is less than 10 kilometers [km] from the coast is set to high (impact priority Pi: first level), the impact priority Pi of areas 104 of land 80 that is from 10 to less than 20 kilometers [km] from the coast is set to intermediate (impact priority Pi: second level), and the impact priority Pi of areas 104 of land 80 that is 20 kilometers [km] or more from the coast is set to low (impact priority Pi: third level) (process of step S32).

FIG. 6 shows an example of a delivery priority table 110, in which a comprehensive priority level Pt (comprehensive priority ranking) is indicated, which is determined by the control unit 52 in consideration of the classification priority Ps and the impact priority Pi noted above.

With the delivery priority table 110, as an example, the rankings of the classification priority Ps and the impact priority Pi are summed, and the comprehensive priority levels Pt (delivery priority levels) of areas 104 for which the value of the sum Σ is small are set so as to become greater. In the event that values of the sum Σ are of the same value, the comprehensive priority level Pt having the higher classification priority Ps is determined to be higher (process of step S32).

Next, in step S33, the control unit 52 confirms the position information Ip of the mobile terminal 14 that is stored in the terminal position storage device 54, and in step S34, it is judged whether or not the latest updated time of the confirmed position information Ip is a time that lies within a second predetermined time period T2 (T2>T1), for example 15 minutes, from the present time.

Next, in step S35, with respect to mobile terminals 14 whose position information Ip has been updated within the second predetermined time interval T2 (step S34: YES), it is determined which of the disaster forecast zones 100 (see FIGS. 4 and 5) the mobile terminals 14 are positioned in.

In step S34, in the case that a time has elapsed, which is longer than the second predetermined time interval T2 from the time at which the position information Ip of the mobile terminal 14 was last updated (step S34: NO), and in step S35, in the case that the mobile terminal 14 whose position is specified is not positioned within a disaster forecast zone 100 (step S35: NO), in such an excluded mobile terminal 14, the process is brought to an end without delivering emergency information thereto.

Next, with respect to mobile terminals 14 for which the latest updated time of the position information Ip lies within the second predetermined time interval T2, and that is positioned within a disaster forecast zone 100, in step S36, the impact priorities Pi are determined for each of the aforementioned areas 104 (refer to the circled numbers 1 to 3 in FIG. 6), and together therewith, in step S37, the classification priorities Ps (severity of the disaster) for each of the areas 104 are determined corresponding to the classification priorities Ps (high, intermediate, or low in FIG. 6) for each of the aforementioned disaster forecast zones 100.

Further, in step S38, the control unit 52 of the server 50 delivers simultaneously and immediately (in real time) the emergency information at each of predetermined quantities corresponding to the number of available lines, in a descending order of the comprehensive priority Pt, i.e., the priority ranking (priority level), thereof.

In this case, in step S11, according to the disaster information delivery and receiving sequence of the mobile terminal 14 in FIG. 2, by way of the disaster prevention interrupt application 36, the control unit 32 of the mobile terminal 14 receives delivery of the emergency information from the information center 16.

Next, in step S12, on the map screen on the display device 23 of the DA device 24 and on the map screen on the display device 28 of the mobile terminal 14, in which the navigation application 34 has been activated, the screen display of FIG. 4 is displayed, for example, as a semi-transparent display, and corresponding disaster information is output to the interior of the vehicle 12 as a voice message from the speaker 25 of the DA device 24.

Figure 7:
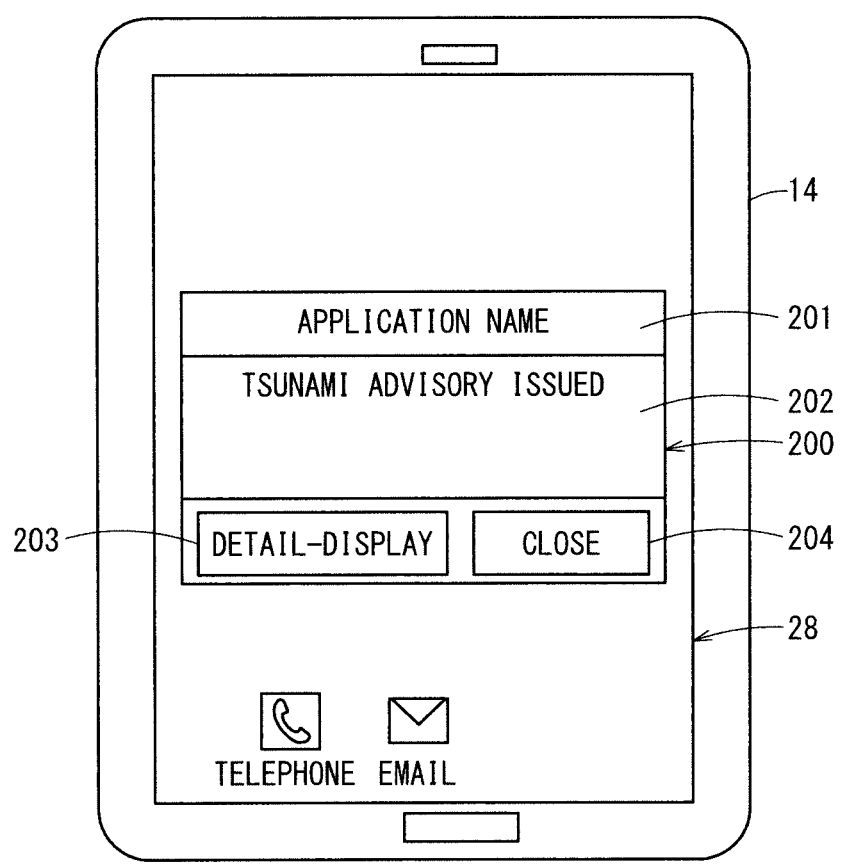
FIG. 7 is an explanatory drawing of a push screen that is displayed on a mobile terminal in which a navigation application has not been activated.

On the other hand, in the case that the navigation application 34 has not been activated, as shown in FIG. 7, the disaster prevention interrupt application 36 displays a push screen 200 on the display device 28 of the mobile terminal 14. In the push screen 200, there are displayed, respectively, an application name 201 of the navigation application 34, a disaster classification content 202 (in this case, "Tsunami Advisory Issued"), a close button 204, and a detail-display button 203 for activating or starting up the navigation application 34.

If the user 26 performs an operation to touch the detail-display button 203, the navigation application 34 is activated. Upon doing so, immediately, a request is made from the mobile terminal 14 with respect to the server 50 of the information center 16 for delivery of the corresponding disaster information, and in response to this request, when the corresponding disaster information is delivered from the server 50, the screen display of FIG. 4 is displayed as a semi-transparent display on the map screen of the display device 28 of the mobile terminal 14 and on the map screen of the display device 23 of the DA device 24, and corresponding disaster information is output to the interior of the vehicle 12 as a voice message from the speaker 25 of the DA device 24. Instead of a voice message, a notification sound only may be output.

Having viewed the screen of the disaster information (emergency information) of FIG. 4, the user 26, at the current self-position thereof, can quickly discern the information for which the degree of influence that is separated out from the emergency information is large, and can swiftly take actions responsive to a disaster or the like.

Overview of the Embodiment

As has been described above, the navigation system according to the above-described embodiment is applied suitably to a navigation system 20 that is configured to transmit information (map information including facility information, etc.) concerning the surrounding area of the terminal positions from the server 50 to the respective mobile terminals 14, when the server 50 receives terminal position information Ip, which is transmitted at each of the first predetermined times T1, which define predetermined time intervals, individually from mobile terminals 14 that serve as client terminals.

In the navigation system 20, the server 50 includes the terminal position storage device 54 that sequentially updates and stores the respective terminal position information Ip when it is received from the respective mobile terminals 14. Further, when it is recognized that an emergency situation has occurred, the server 50 divides a region that is affected by the emergency situation into a plurality of areas 104 to which priority levels are given (ascribed) for each degree of influence of the emergency situation thereon, retrieves from the terminal position storage device 54 positions of the mobile terminals that reside within the divided areas 104, prioritizes mobile terminals 14 positioned within an area 104 for which the degree of influence is large, and delivers immediately and simultaneously thereto the information relating to the emergency situation, regardless of the time at which the terminal position information Ip was received, and forcibly displays the information that was delivered relating to the emergency situation on the display device 28 of the mobile terminals 14 and on the display device 23 of the DA device 24, which serve as monitors.

In this manner, upon the occurrence of an emergency situation such as when a disaster occurs or the like, information of the emergency situation, which is delivered preferentially from the server 50 with respect to each of the mobile terminals 14 positioned in regions (areas 104) where the degree of influence is large, can be delivered immediately and simultaneously thereto regardless of the time at which the terminal position information Ip is received, and information of the emergency situation can be displayed on the display device 23 of the DA device 24, and on the display device 28 of the mobile terminals 14 to which such information was delivered.

In this way, preferential delivery of information is enabled without placing an excessive load on the server 50. As a result, users 26 of the respective mobile terminals 14, at the current self-position thereof, can quickly receive information for which the degree of influence that is separated out from the emergency information or the like is large, and can swiftly take actions responsive to a disaster or the like.

Further, since information, which has a small effect on the self-position at that time, is not received unnecessarily, it is possible to suppress any undue worries with respect to the emergency information.

In this case, when it is recognized that an emergency situation has occurred, the server 50 may aggregate a number of the mobile terminals 14 that reside internally within each of the divided areas 104 as to the latest updated positions of the mobile terminals 14. In the case that a number of deliveries from the server 50 to the respective mobile terminals 14 exceeds a predetermined number for which simultaneous delivery is possible, the server 50 may divide the number of deliveries into a plurality of times within a range of the predetermined number, prioritize the mobile terminals 14 positioned within the area 104 for which the degree of influence is large, and deliver simultaneously thereto the information relating to the emergency situation.

According to the present invention, since the server 50 grasps the number of the mobile terminals 14 that are to serve as delivery targets, and performs preferential delivery to mobile terminals 14 for which the degree of influence of a disaster is large, in the case that the information is delivered all at once, even under a condition in which the number of communication lines for simultaneous delivery is limited, it is possible for such information to be delivered quickly and without difficulty.

Furthermore, the server 50 may set position information Ip of the respective mobile terminals 14, for which the respective terminal position information Ip therefor that are stored in the terminal position storage device 54 have not been updated even though a preset time has elapsed, as objects to be excluded from those retrieved from the server 50.

More specifically, the server 50 judges that the mobile terminals 14 have already moved from positions that have not been updated and excluding them from the information delivery targets, if the terminal position information Ip of the mobile terminals 14 has not been updated within a preset time period. Then, erroneously displaying information outside of the target areas (impact-free areas, etc.) can be prevented, for a case in which the mobile terminals 14 are mounted, for example, in automobiles.

Further still, when it is recognized that an emergency situation has occurred, and upon dividing the region that is affected by the emergency situation into a plurality of areas 104 to which priority levels are given for each degree of influence of the emergency situation thereon, retrieving from the terminal position storage device 54 the position information Ip of the respective mobile terminals 14 that reside within each of the areas 104, prioritizing the mobile terminals 14 that reside within the area 104 for which the degree of influence is large, and delivering simultaneously thereto the information relating to the emergency situation, and furthermore, when a warning or advisory is set for the region that is affected by the emergency situation, the server 50 may determine a priority ranking (comprehensive priority level Pt) for the simultaneous delivery, based on the classification priority Ps of the warning or the advisory, and the impact priority Pi of the area 104.

For example, even concerning a disaster for which the geographical impact thereof is large, such as a tsunami warning, delivery of information is carried out, to which a priority ranking is given taking into consideration the area 104 where delivery is attempted, and the degree of influence (the classification priority Ps and the impact priority Pi) of the tsunami on the terrain.

The present invention is not limited to the above embodiment, and as a matter of course, various alternative or modified configurations may be adopted therein based on the descriptive content of the present specification.

The invention claimed is:

1. A navigation system configured to transmit from a server information concerning surrounding areas corresponding to respective client terminals placed inside respective vehicles, when terminal position information, which is transmitted at a predetermined interval individually from the respective client terminals, is received by the server, wherein the server is configured to:
include a terminal position storage device configured to sequentially update and store the respective terminal position information when the respective terminal position information is received from the respective client terminals;

when occurrence of an emergency situation is recognized, divide a region that is affected by the emergency situation into a plurality of areas to which priority levels are given for each degree of influence of the emergency situation thereon;

retrieve from the terminal position storage device positions of the client terminals that reside within the divided areas;

prioritize the client terminals positioned within an area for which the degree of influence is large as information delivery targets, and deliver immediately and simultaneously information relating to the emergency situation to the information delivery targets, regardless of time at which the terminal position information therefrom was received;

forcibly display the information relating to the emergency situation on a monitor of the client terminal to which the information was delivered; and set each of the client terminals, for which the respective terminal position information therefor that is stored in the terminal position storage device has not been updated even though a preset time has elapsed, as an object to be excluded from those retrieved from the server, and exclude the object client terminal from the information delivery targets.

2. The navigation system according to claim 1, wherein the server is configured to:

when the occurrence of the emergency situation is recognized, aggregate a number of the client terminals that reside internally within each of the divided areas as to latest updated positions of the client terminals; and in a case that a number of deliveries from the server to the respective client terminals exceeds a predetermined number for which simultaneous delivery is possible, divide the number of deliveries into a plurality of times within a range of the predetermined number, prioritize the client terminals positioned within the area for which the degree of influence is large, and deliver simultaneously thereto the information relating to the emergency situation.

3. The navigation system according to claim 1, wherein:

when the occurrence of the emergency situation is recognized, and upon dividing the region that is affected by the emergency situation into a plurality of areas to which priority levels are given for each degree of influence of the emergency situation thereon, retrieving from the terminal position storage device the terminal position information of the respective client terminals that reside within each of the areas, prioritizing the client terminal that resides within the area for which the degree of influence is large, and delivering simultaneously thereto the information relating to the emergency situation, and in addition, when a warning or advisory is set for the region that is affected by the emergency situation, the server is configured to determine a priority ranking for the simultaneous delivery, based on a priority level of the warning or the advisory, and a priority level of the area.

* * * * *